(No Model.)

J. W. KELLER.
FARM OR STOCK YARD GATE.

No. 582,427. Patented May 11, 1897.

WITNESSES
J. W. John
N. B. Hallahan

INVENTOR
John W. Keller
PER N. C. Gardiner
ATTORNEY

UNITED STATES PATENT OFFICE.

JOHN W. KELLER, OF ELK POINT, SOUTH DAKOTA, ASSIGNOR OF ONE-HALF TO J. T. MARTIN, OF SAME PLACE.

FARM OR STOCK-YARD GATE.

SPECIFICATION forming part of Letters Patent No. 582,427, dated May 11, 1897.

Application filed March 11, 1897. Serial No. 626,930. (No model.)

*To all whom it may concern:*

Be it known that I, JOHN W. KELLER, a citizen of the United States, residing at Elk Point, in the county of Union and State of South Dakota, have invented certain new and useful Improvements in Farm or Stock-Yard Gates; and I do hereby declare that the following is a full, clear, and exact description of the invention, which will enable others skilled in the art to which it appertains to use the same.

My invention relates to farm-gates, and has for its object the construction of a gate especially adapted for use in stock-yards and on farms. It is so constructed that it may easily be lifted clear of the ground to any desired height and opened or shut in that position.

Reference is had to the accompanying drawings, which form a part of the specification, and in which—

Figure 1:
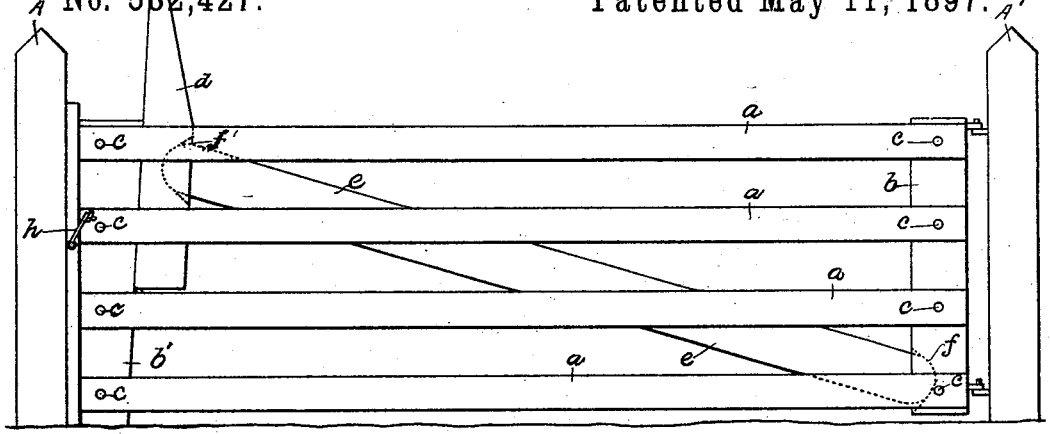
Figure 4:
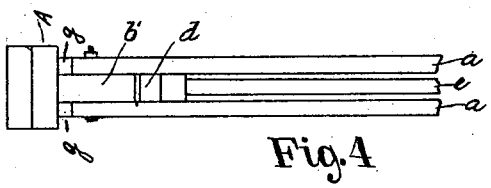
Figure 3:
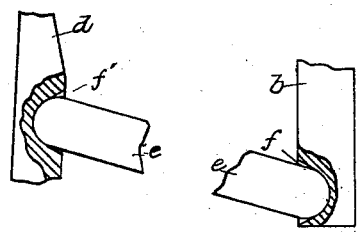
Figure 2:
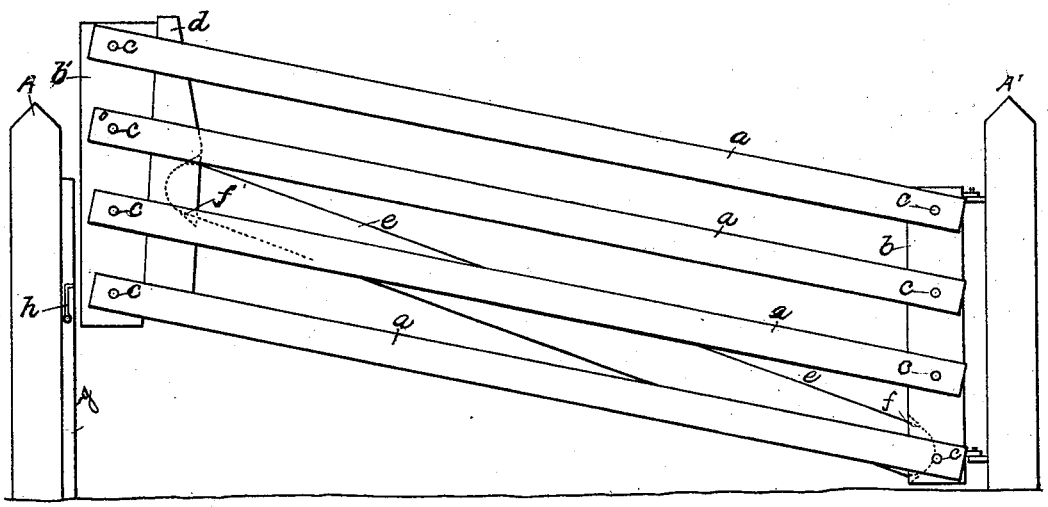

Figure 1 is a view of gate in side elevation, showing the same hung upon hinges in the ordinary manner and closed and latched. Fig. 2 is also a view in side elevation, showing the gate raised ready to swing. Fig. 3 is a detail view of brace which maintains the rigidity of the gate in any position and its adjustment to the sockets in the uprights and standard. Fig. 4 is a plan view of one end of the gate, showing the double rails.

Like parts are designated by similar letters of reference throughout the several views.

A represents the post to which the free end of the gate is latched when closed; A', the post to which the gate is hinged.

*a a a* are the rails of the gate and are made of any suitable material, preferably of one-inch boards or wire.

*b* and *b'* are cross-pieces or uprights made of scantling, there being one at each end of the rails, the rails being pivotally secured to them by means of the bolts *c c c*. The upright *b'* is somewhat wedge-shaped, the wide end being uppermost. The rails are double, the same number being secured to each side of the uprights, as shown in Fig. 4.

*d* is a standard made of scantling and is freely held between the rails *a a* and adapted to be raised and lowered when the gate is opened and shut. One of the upper corners of said standard is cut away for the purpose of lightness. A brace *e* extends diagonally between the lower part of the cross-piece *b* at the hinged end of the gate and the central part of the standard *d*. This brace is rounded at the ends and is inserted in the sockets *f* and *f'* of the brace *b* and standard *d*, respectively. The sockets are somewhat larger than the brace to give the ends of the latter sufficient scope. The brace is located between the rails and with the action of the standard is adapted to hold the gate rigidly in whatever position the gate is placed. When the gate is closed, the upright *b'* falls between the cleats *g g*, secured to the post A. A hook *h* is attached to one of said cleats for the purpose of securing the gate, when closed, in the ordinary manner, as shown in Fig. 1.

The operation of my gate is as follows: The gate being closed, as shown in Fig. 1, and it being desired to open the same, the hook is first removed and by vertically lifting the upright *b'* or the most convenient rail the free end of the gate is elevated to any desired position. As the gate is raised the standard *d* drops of its own weight, bringing with it also the adjacent end of the brace *e*, which maintains the rigidity of the gate in its elevated position, as seen in Fig. 2. The gate is then swung upon its hinges in the ordinary manner. In practical operation the gate may be elevated to an angle of about forty-four degrees with the post A', the only limit being the tendency of the brace to drop out of the socket *f* if the gate is raised too high. To close and secure the gate, swing it into position so that the upright *b'* will fall between the cleats *g g*, then raise the standard *d*, and the gate will descend of its own weight, sufficiently retarded by friction with the wedge to prevent too abrupt fall. It will be seen that this gate is easily operated and may be opened and closed by a child or by a person upon horseback. The operation of the brace *e* with the standard *d* prevents all dragging of the gate, and the gate may be adjusted to unevenness of the ground, while by raising it slightly within the cleats it permits small stock to pass beneath, the larger stock being excluded. This gate is especially adapted for farms and stock-yards, and may be constructed either solidly, as entirely of boards, or lightly, the rails being of wires. If constructed of wires, the standard and brace operate in exactly the same manner, the rigidity of the wires being constantly maintained.

I am aware that the idea of elevating some of the lower rails of a gate and also of elevating the free end of the gate without regard to the hinge end is not new; but in all the gates which have come to my knowledge only a very limited elevation is permitted by the construction, and no means are provided for maintaining the rigidity of the gate in whatever position it is placed or irrespective of the material of which it is composed.

Having described my invention, what I claim as new, and desire to secure by Letters Patent, is—

1. A farm and stock-yard gate composed of double rails pivotally secured to uprights at each extremity of said rails, a standard freely held between the rails at the free end of said gate, said standard having a socket on the inner edge, near the central portion of said standard, a brace adapted for insertion in said socket and extending diagonally between the double rails to a corresponding socket at the lower end of upright at the hinge end of said gate, said brace and standard adapted to be adjusted to the changed position of said gate as the same is raised and lowered, and capable of maintaining the rigidity of said gate, substantially as described.

2. A farm and stock-yard gate having double rails $a, a, a,$ pivotally secured by bolts $c, c, c,$ to uprights $b$ and $b'$ at the ends of said gate, a wedge-shaped standard $d$, freely held between said double rails and adjacent to said upright $b'$, said upright $b$ and standard $d$ having sockets $f$ and $f'$ facing inwardly, a brace $e$, extending diagonally between said upright and standard and adapted for insertion in said sockets, said brace and standard adapted for adjustment to the position of said gate and capable of maintaining the rigidity of the same, substantially as described.

In witness whereof I have hereunto subscribed my name in the presence of two witnesses.

JOHN W. KELLER.

Witnesses:
C. W. BUCHANAN,
L. S. LEWISON.